July 8, 1969 W. D. SCHMIDT 3,453,730
CUTTING IMPLEMENT
Filed July 28, 1967

INVENTOR
WILLIAM D. SCHMIDT
BY
Mason, Mason & Albright
ATTORNEYS

United States Patent Office 3,453,730
Patented July 8, 1969

3,453,730
CUTTING IMPLEMENT
William D. Schmidt, P.O. Box 31,
La Crosse, Wis. 54601
Filed July 28, 1967, Ser. No. 656,834
Int. Cl. B26b *13/00, 13/28*
U.S. Cl. 30—248                                    7 Claims

ABSTRACT OF THE DISCLOSURE

This invention is a cutting implement having blades pivotably interconnected to cooperate scissors-like. A guide strip is mounted above one blade to extend transversely across the blade. A lip element is affixed above the second blade so that upon closing, the guide strip is wedged between the lip element and the second blade, forcing the two blades closely together in a shearing action.

It is an object of the present invention to provide a pair of clippers or the like in which the blades are forced together upon closing. Further, the blades are provided with simple but strong guide means so that the clippers will still function after extensive use in heavy or thick grass and undergrowth.

Figure 1:
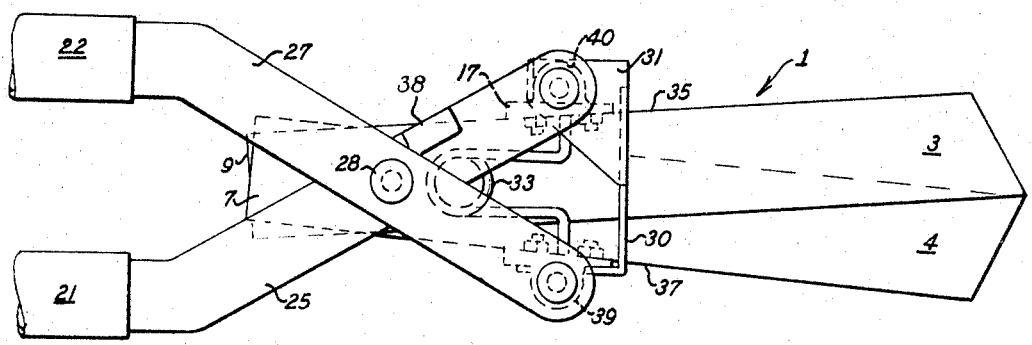
FIGURE 1 is a top plan view of the clippers with the blades closed.
Figure 2:
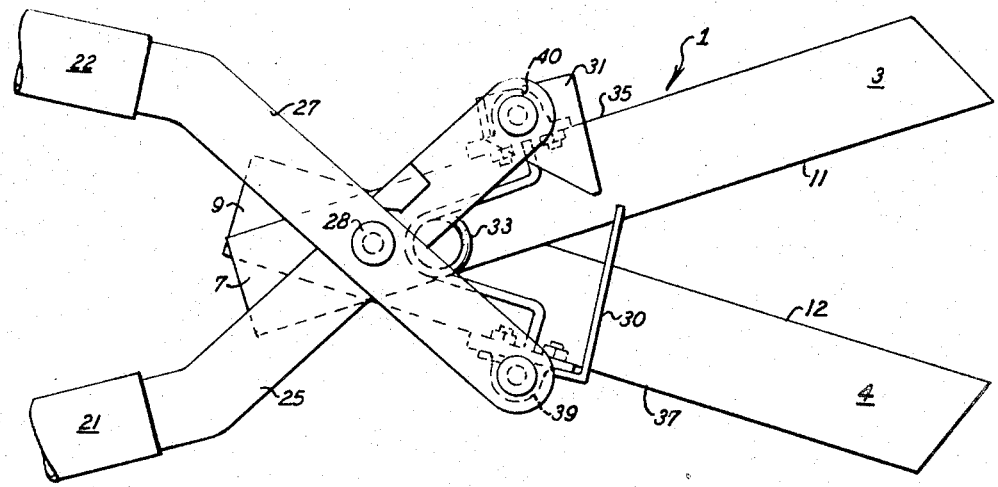
FIGURE 2 is a top plan view with the blades open exposing guide means.
Figure 3:
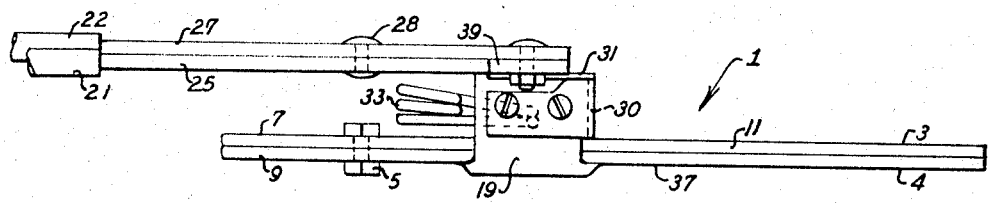
FIGURE 3 is a side elevation of the clippers of FIGURE 1.

In the drawings, a pair of clippers are shown having blades 3 and 4 pivoted about pivot pin 5. The blades have opposing cutting edges 11 and 12 which cooperate in a shearing action upon closing. Each blade is attached to a handle 22 and 21 respectively, through extensions 27 and 25. Extension 27 is affixed to an upright support 19 secured to the outside edge 37 of blade 4. Extension 25 is secured to upright support 17 which is attached to the outside edge 35 of blade 3 and the extensions 25 and 27 are pivoted to one another by a second pivot element 28 above blades 3 and 4. Thus squeezing the handles 21 and 22 together acts to force the blades 3 and 4 together in a shearing action.

On one of the uprights 19, a guide strip 30 is attached by welding or preferably secured by nuts and bolts for easy removal and replacement. Guide strip 30 extends transversely across blade 4 so that the lower edge of strip 30 contacts the top of blade 3. Also, the guide strip 30 is spaced slightly above blade 4 to allow blade 3 to pass between the strip and blade 4. With this arrangement, blade 4 is raised in close contact with blade 3 and edges 11 and 12 act to shear grass or other matter being cut.

On upright support 17, a lip element 31 is affixed to project forwardly and the top edge of guide strip 30 passes under element 31 when the blades are closed. Guide strip 30 is fitted to wedge between lip element 31 and blade 3 as the shears are operated, insuring a proper cut even in heavy turf or undergrowth. Preferably extensions 27 and 25 are attached to horizontal portions 39 and 40 of upright supports 19 and 17, respectively, by nuts and bolts so that adjustments can be made or parts easily replaced. Also, a stop 38 is affixed to extension 25 to limit the spread of the blades 3 and 4 in open position. Spring 33, attached to upright supports 17 and 19, urges blades 3 and 4 to the open position. Preferably pivot pin 5 and pivot element 28 are in substantial vertical alignment.

The above description and drawings disclose a single embodiment of the invention, and specific language has been employed in describing the several figures. It will, nevertheless, be understood that no limitations of the scope of the invention are thereby contemplated; and that various alterations and modifications may be made such as would occur to one skilled in the art to which the invention relates.

Having thus described my invention, what I claim as new and desire to secure by Letters Patent of the United States is:

1. A cutting implement having a pair of cutting blades pivotably connected to one another about a pivot pin, said pin located adjacent the lower ends of said blades, said blades having opposed cutting edges that cooperate in a scissors-like cutting operation, upright supports affixed to each blade, a handle with an extension portion connected to each of said upright supports, said extension portions being pivotably connected intermediate their ends by pivot means to cross one another above said blades whereby the actuation of said handles reciprocates said blades, a guide strip connected to the first of said blades to extend in a transverse direction, a lip element affixed to project above the second of said blades, said strip being wedged between the second of said blades and said lip element when said blades are moved to closed position.

2. The implement of claim 1 wherein said lip element is affixed to the upright support connected to the second of said blades.

3. The implement of claim 1 wherein a resilient spring is connected to said upright supports to urge the blades apart in open position.

4. The implement of claim 1 wherein said pivot pin and said pivot element are in substantial vertical alignment.

5. The implement of claim 1 wherein said upright supports are connected to said blades adjacent the outside edges of their respective blades.

6. The implement of claim 1 wherein a stop is affixed to the top of one of said extensions and the other of said extensions rests against said stop when the blades are in open position.

7. The implement of claim 1 wherein said supports have upper horizontal portions to which said extensions are coupled.

References Cited

UNITED STATES PATENTS

| 903,370   | 11/1908 | Frey    | 30—261 X |
| 1,636,088 | 7/1927  | Bernard | 30—262 X |
| 1,943,960 | 1/1934  | Heumann | 30—252 X |
| 3,187,430 | 6/1965  | Wallace | 30—252   |

LESTER M. SWINGLE, *Primary Examiner.*

J. C. PETERS, *Assistant Examiner.*

U.S. Cl. X.R.

30—266, 271